United States Patent [19]

Kupper et al.

[11] 4,291,776

[45] Sep. 29, 1981

[54] SCALE WITH CANTILEVER BEAM STRAIN MEASUREMENT

[75] Inventors: Walter Kupper, Madison, N.J.; Diethelm Utzinger, Zurich, Switzerland

[73] Assignee: Mettler Instrumente AG, Greifensee-Zürich, Switzerland

[21] Appl. No.: 39,953

[22] Filed: May 17, 1979

[51] Int. Cl.³ .......................... G01G 3/08; G01G 3/14
[52] U.S. Cl. .................................... 177/229; 177/211
[58] Field of Search ................. 177/229, 211, DIG. 9; 73/141 A

[56] References Cited

U.S. PATENT DOCUMENTS

| | | | |
|---|---|---|---|
| 2,859,613 | 11/1958 | Green | 73/141 A |
| 3,133,609 | 5/1964 | Lau | 177/DIG. 9 |
| 3,151,693 | 10/1964 | Chapman | 73/141 A X |
| 3,304,773 | 2/1967 | Rogallo | 73/141 |
| 4,062,416 | 12/1977 | Berg et al. | 177/229 X |
| 4,065,962 | 1/1978 | Shoberg | 73/141 A |
| 4,146,100 | 3/1979 | Jacobson et al. | 177/211 |
| 4,196,784 | 4/1980 | Suzuki et al. | 177/211 |

FOREIGN PATENT DOCUMENTS 2740668 3/1978 Fed. Rep. of Germany .
2741303 3/1978 Fed. Rep. of Germany .

*Primary Examiner*—George H. Miller, Jr.
*Attorney, Agent, or Firm*—Marianne Rich

[57] ABSTRACT

A cantilever beam is located under the pan of the scale and carries a strain gauge bridge circuit. The beam has a bore perpendicular to its longitudinal axis. A rigid force transmitting arm is screwed to the free end of the beam and extends back so that a conical peg in the arm projects into the bore. The conical peg engages a rod which transmits a force from the load to be weighed. The beam has two arcuate recesses symmetrical to the bore on its underside. Strain gauge resistors are positioned so that their centers coincide with the thinnest, and therefore maximum bending sections of the beam.

10 Claims, 4 Drawing Figures

Figure 4
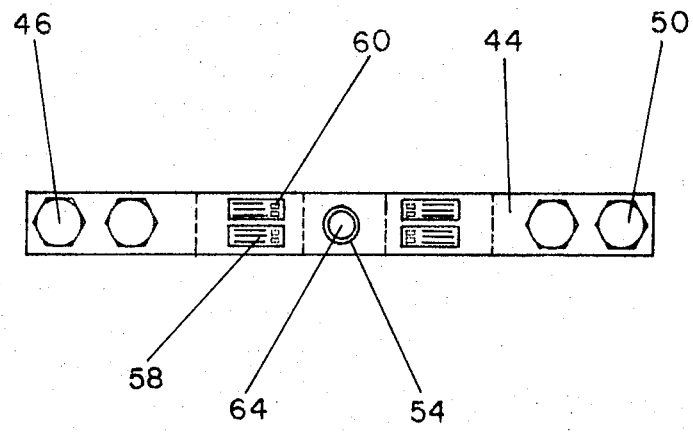
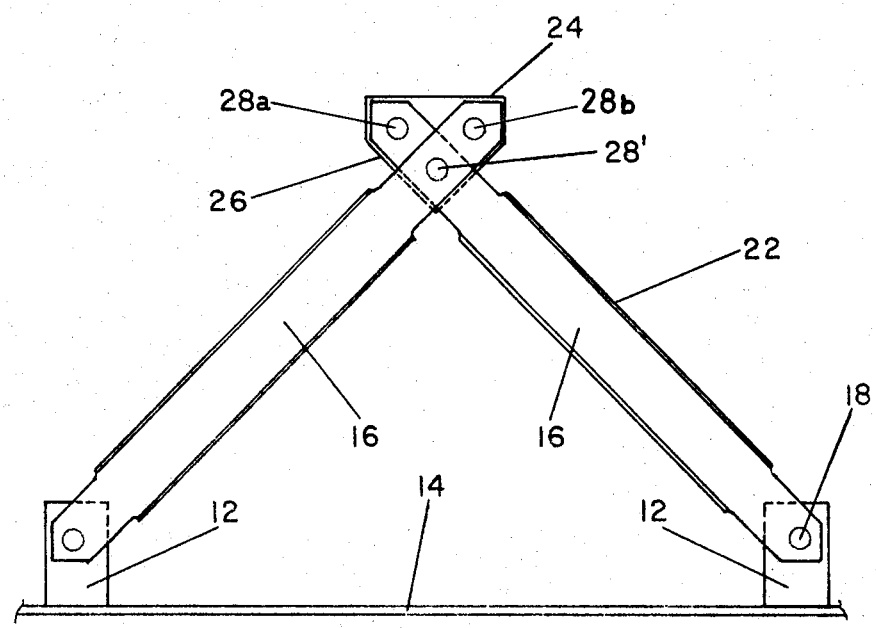
Figure 2

SCALE WITH CANTILEVER BEAM STRAIN MEASUREMENT

The present invention relates to scales wherein the load receiving structure is carried by two parallel linkages and strain gauges are used as weight sensors.

BACKGROUND AND PRIOR ART

This type of scale is described in U.S. Pat. No. 3,304,773. Further examples of publications disclosing this type of load cell are U.S. Pat. No. 4,065,962 and Published German patent applications Nos. 27 40 668 and 27 41 303. In the apparatus disclosed in the two last-mentioned publications, relatively much height is required for the construction of the measuring unit. The disadvantage of the system of the first-named patent is that the arrangement of the strain gauge resistors is such that the mounting of the resistors and the servicing thereof is difficult. Further, it is not always desirable to use the measuring unit with the strain gauge resistors as such as parallel support linkages for the load receiving structure.

SUMMARY OF THE INVENTION

It is an object of the present invention to furnish a scale in which the measuring unit is particularly simple and compact. It is a further object of the present invention to furnish a scale wherein the force transmission is stable and simple and wherein the measuring unit is readily manufactured, assembled and calibrated.

In accordance with the present invention, a cantilever beam is located underneath a load receiving member of the scale and has an anchored end, a free end portion, and a bore intersecting the longitudinal axis of the beam. Sensing means are provided for sensing the strains set up in said cantilever beam. Force transmitting means transmit force from the load receiving member to the cantilever beam and include a first force transmitting member coupled to said free end portion of said cantilever beam and having a portion aligned with said bore and a second force transmitting member for transmitting force from said load receiving member to said first force transmitting member. The first force transmitting member is a rigid arm which undergoes at most negligible deformation under the applied force.

In a preferred embodiment, the cantilever beam has arcuate recesses placed symmetrically to the bore and strain gauges constituting the sensing means are carried by the beam opposite the arcuate recesses.

In a further preferred embodiment, the first force transmitting member transmits force to the second force transmitting member in the plane of the neutral bending fiber of the beam and approximately at the point of inflection of the deformation curve. This causes the measuring result to be linear to a great extent and substantially independent of small shifts of the point at which the force is being applied.

The fact that the force is transmitted below the beam creates the desired stable conditions and allows a particularly favorable placement of the strain gauge resistors.

In a further preferred embodiment, the second force transmitting means comprises a force transmitting rod having a conical recess at each end. Engagement of the rod takes place by means of a conical projection or peg at the load receiver and at the force transmitting arm. This results in a centering which causes a very exact force transmission with very little friction and, in addition, allows easy assembly and disassembly. Further, the length of the rod does not affect its function and can therefore be freely selected.

It is further desirable that the point at which the force transmitting member engages the load receiver is adjustable in height. This allows a simple adjustment for fixing the allowable overload.

It is further preferred that arcuate recesses be provided in the beam to locate the maximum bending areas in which the strain gauges are to be positioned. The arc shape results in a continuous change in the strain at the bending locations in contrast to the pattern set up by rectangular recesses.

In a further preferred embodiment, the strain gauge resistors are arranged symmetrically relative to the bore, the soldering joints being at the ends of the resistors immediately adjacent to the bore. Thus all the resistors and the soldering joints are on the one hand readily accessible from above and, on the other hand, the soldering joints are located at a position of the beam which undergoes relatively little bending. It is desirable that the centers of the resistance strips are at least approximately at the thinnest places of the beam in the region of the arcuate recesses. This causes the maximum value of stress and strain in the center of the resistance strips and a relatively small stress and strain at the strip ends. The deformation of the beam due to clamping of the end does not influence the measured values.

In a further preferred embodiment, the force transmitting arm is screwed to the cantilever beam.

It is further desirable that the parallel support structure include two pairs of resilient links arranged at right angles to each other. This embodiment allows independent adjustment of diagonal load errors in two orthogonal directions.

The novel features which are considered as characteristic for the invention are set forth in particular in the appended claims. The invention itself, however, both as to its construction and its method of operation, together with additional objects and advantages thereof will best be understood from the following description of a now preferred embodiment when read in connection with the accompanying schematic drawing.

FIG. 2 is a top view along line 2—2 of FIG. 1;

FIG. 4 is a top view of the cantilever beam carrying the strain gauges.

DESCRIPTION OF THE PREFERRED EMBODIMENT

Figure 1:
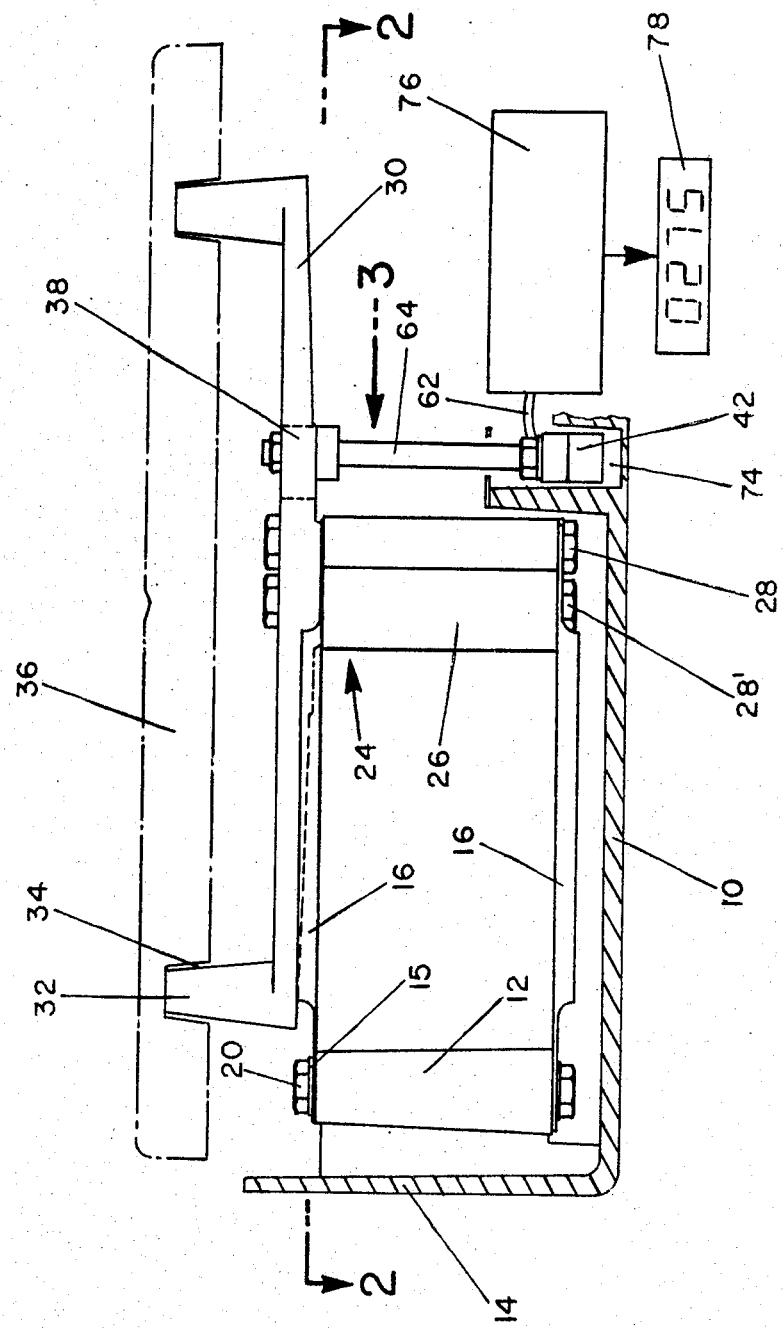
FIG. 1 is a side view, partly in section, of the scale of the present invention.

In order to facilitate understanding of the invention, some parts of the scale not relevant to the invention have either been completely omitted or are indicated in general terms only. Further, the drawing is not to scale.

As shown in FIGS. 1 and 2, two pedestals 12 are rigidly connected to the back wall 14 of the housing of the scale. The ends of one pair of links 16 each are fixedly connected to the top and bottom of the pedestals (see bores 18, screws 20). The center portion of links 16 has a U-profile formed by flanges 22 so that the maximum bending takes place between the clamped ends and the U-profile. Links 16 are arranged at an angle of 90° relative to each other and intersect at a column 24. Column 24 has a prismatic shape with two side surfaces 26 arranged at right angles to each other. Links 16 are screwed to column 24 (bores 28, 28'). Specifically, one screw (28') each extends through two Link ends while screws 28a and 28b each fasten a single Link end. The above-described link support, as shown in FIG. 2, is very effective in preventing turning of the pan support 30 with respect to its vertical axis. Differences in height are compensated for by spacer discs, while U-shaped slotted washers 15 of differing thicknesses are used for adjusting the height of the parallelogram linkage. While the lower pair of links 16 is directly screwed to column 24, upper links 16 are clamped in sandwich fashion via spacer discs between column 24 and a pan support 30. The latter is constructed as a stable light metal cross near whose ends four pegs 32 are affixed. Pegs 32 support a square-shaped pan 36 having recesses 34 engaging pegs 32. Pan 36 may be made of metal, for example stainless steel. Otherwise, particularly if good chemical resistance is required, the pan may be a molded glass ceramic body.

The arms of cross-shaped support 30 are arranged at 90° to each other. In the plane of the arms and extending from the center of the cross is an extension arm 38 which has a threaded hole 39 and a larger diameter recess 40 concentric thereto and adjacent its lower end. Arranged underneath extension arm 38 is the measuring unit 42. It includes a cantilever beam 44 which has a fixed end screwed at 46 to the base 10 of the housing of the scale. Force transmitting arm 48 is screwed to the free end of beam 44 by means of screws 50. A peg 52 having a conically shaped top 66 is set into arm 48 at the free end thereof. Force transmitting arm 48 is constructed of material and has dimensions such that its deformation under the maximum force applied thereto is negligible. A suitable material is steel.

Figure 3:
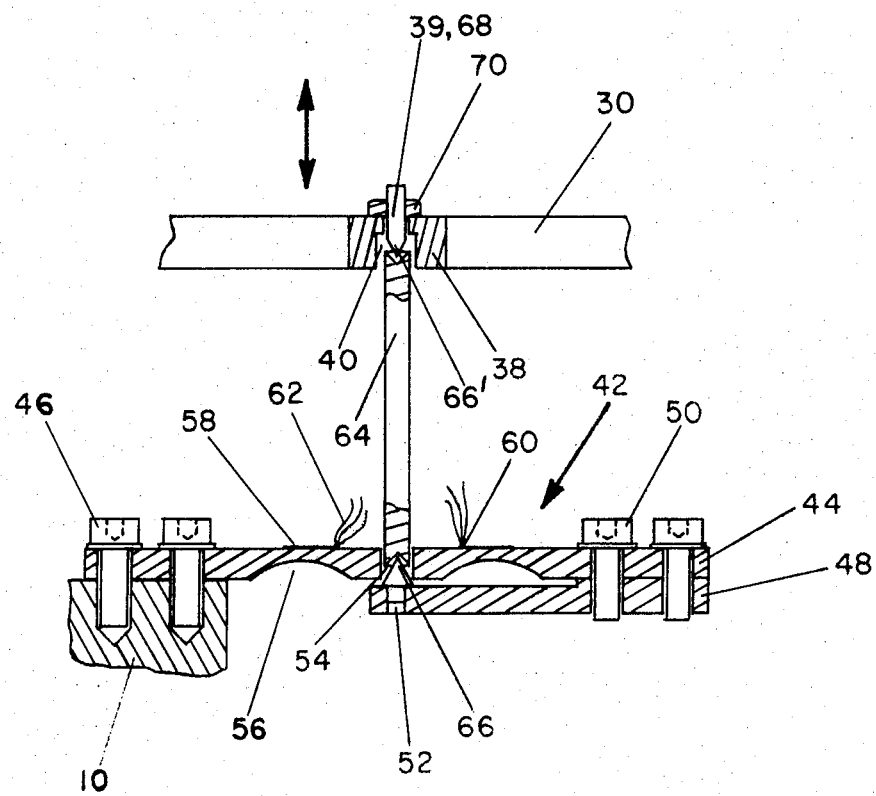
FIG. 3 is an enlarged detail of FIG. 1, as indicated by arrow 3 therein and showing the measuring unit, partly in section.

A bore 54 is located in the middle of beam 44. Bore 54 is in vertical alignment with peg 52 and threaded hole 39. Beam 44 further has two arc-shaped recesses 56 which are positioned symmetrically to bore 54 and which define its zones of maximum bending. Two equivalent pairs of strain gauge resistors 58 are fixedly mounted on beam 44 over arc-shaped recesses 56. The soldering joints 60 and electrical connecting leads 62 (FIGS. 2 and 3) are located at the ends of the resistors adjacent to bore 54.

Transmission of force from the load supporting means which include pan 36, pan support 30 and column 24 to the measuring unit 42 takes place by means of a round rod 64 with a conically-shaped recess at the upper and the lower end. The recess at the lower end rests on conical top 66 of peg 52, while the recess at the upper end is engaged by conically-shaped end 66' of a set screw 68. The latter is threaded in tapped hole 39 of extension arm 38 and is set to a desired height by means of a lock nut 70. Turning of set screw 68 allows the range of free vertical movement between base 10 of the housing and the lower screw heads of screws 28a, b and 28' to be regulated. This constitutes an adjustment of the allowable overload, that is the load which will cause the movable parts of the scale to come in contact with the base of the housing.

A recess 74 (FIG. 1) in base 10 of the scale housing receives force transmitting arm 48. Further shown in FIG. 1 are the electrical parts of the scale in schematic representation (block 76) as well as a digital display 78.

The measuring process in scales of this type is well known and will therefore only be summarized briefly:

A load to be weighed is put on pan 36 and exerts a force. The load supporting means are resiliently mounted by means of the parallel construction of links 16. Force is transmitted from the load supporting means (pan support 30, column 24) and connecting rod 64 to the measuring unit 42. During measurement, force transmitting arm 48 remains rigid, while beam 44 undergoes an S-shaped deformation which is proportional to the applied force. The deformation also occurs in resistors 58, which causes a strain gauge bridge formed by these resistors to become unbalanced. A bridge circuit of this type is well known and will not further be discussed here. It is sufficient to state that the unbalance causes an electrical output signal which is proportional to the supplied force and which, after an analog-digital conversion, causes the digital weight to be indicated on display 78.

In a preferred embodiment, several ways are available to decerease temperature variation of the measured result. First, the measuring unit 42 can be manufactured from an alloy having a constant-temperature modulus, for example an iron-nickel alloy, or from a copper-beryllium alloy or an aluminum-manganese alloy. Further, a computer which is part of block 76 can be programmed to adjust the measured values in accordance with signals received from a temperature sensor. The computer can, by suitable programming, also be used to linearize the measured results.

Strain gauge resistors 58 are preferably evaporated onto beam 44 and etched, with a suitable insulating layer being interposed between the beam and the resistance elements. If desired, an outer insulating layer can also be applied to the resistance layer. This outer insulating layer may, for example, be made of polytetrafluorethylene (deposited, for example by cathode sputtering). This also provides a good protection against moisture and prevents the magnitude of the resistances from changing as a function of such moisture or humidity. The above-mentioned temperature sensors can also be manufactured by an evaporation process. This yields better measuring results than, for example pasted-on resistors, in particular in the lower weight regions. Arranging all of the resistors in a single plane on beam 44 is particularly suitable for this type of manufacture.

Overload protection can be achieved as described above but can also be carried out as follows: a pre-stressed lead spring is substituted for rigid force transmitting arm 48 to support connecting rod 64, but under overload, or if the scale receives a shock, the spring yields thereby removing the load from measuring unit 42.

While the invention has been illustrated in preferred embodiments, it is not to be limited to the circuits and structures shown, since many variations thereof will be evident to one skilled in the art and are intended to be encompassed in the present invention as set forth in the following claims.

We claim:

1. In a scale having load supporting means including a load receiving member for receiving a load to be weighed, and means for supporting said load receiving member;

improved measuring apparatus comprising, in combination, a cantilever beam having an upper surface facing said load receiving member, a longitudinal axis, an anchored end, a free end portion, and a bore intersecting said longitudinal axis;

sensing means positioned on said upper surface for sensing strains set up in said cantilever beam; and means for transmitting force from said load receiving member to said cantilever beam, said force transmitting means comprising a first force transmitting member releaseably coupled to said cantilever beam from beneath and having a portion aligned with said bore, and a second force transmitting member passing with clearance through said bore for transmitting force from said load receiving member to said first force transmitting member.

2. Apparatus as set forth in claim 1, wherein said means for supporting said load receiving member comprises two pairs of resilient links arranged at right angles to each other.

3. Apparatus as set forth in claim 1, wherein said first force transmitting member is a rigid arm having a first end portion coupled to said free end portion of said cantilever beam and a second portion aligned with said bore.

4. Apparatus as set forth in claim 3, wherein said first end portion of said rigid arm is screwed to said free end portion of said cantilever beam.

5. Apparatus as set forth in claim 2, further comprising adjustment means for adjusting the point of engagement between said rod and said load receiving member in a vertical direction.

6. Apparatus as set forth in claim 3, wherein said sensing means comprises
a strain gauge means having a plurality of resistors positioned on said cantilever beam.

7. Apparatus as set forth in claim 6, wherein said cantilever beam has a first and second arcuate recess; and
wherein said plurality of resistors comprises a first set of resistors positioned over said first recess and a second set of resistors positioned over said second recess.

8. In a scale having load supporting means including a load receiving member for receiving a load to be weighed, and means for supporting said load receiving member:
improved measuring apparatus comprising, in combination,
a cantilever beam having a longitudinal axis, an anchored end, a free end portion, a bore intersecting said longitudinal axis, and a first and second arcuate recess located symmetrically to said bore;
sensing means for sensing strains set up in said cantilever beam, said sensing means comprising strain gauge means having a plurality of resistors positioned on said cantilever beam, said plurality of resistors comprising a first and second set of elongated resistors positioned over said first and second recess, respectively, and centered with respect thereto, a first and second electrical lead, and a first and second electrical connection positioned at the end of said first and second set of resistors closest to said bore for connecting said first and second electrical lead to said first and second set of resistors, respectively; and means for transmitting force from said load receiving member to said cantilever beam, said force transmitting means comprising a first force transmitting member coupled to said cantilever beam and having a portion aligned with said bore, and a second force transmitting member passing with clearance through said bore for transmitting force from said load receiving member to said first force transmitting member, and wherein said first force transmitting member is a rigid arm having a first end portion coupled to said free end portion of said cantilever beam and a second portion aligned with said bore.

9. In a scale having load supporting means including a load receiving member for receiving a load to be weighed, and means for supporting said load receiving member:
improved measuring apparatus comprising, in combination,
a cantilever beam having a longitudinal axis, an anchored end, a free end portion, and a bore intersecting said longitudinal axis;
sensing means for sensing strains set-up in said cantilever beam;
means for transmitting force from said load receiving member to said cantilever beam, said force transmitting means comprising a first force transmitting member coupled to said cantilever beam and having a portion aligned with said bore, and a second force transmitting member passing with clearance through said bore for transmitting force from said load receiving member to said first force transmitting member; wherein said cantilever beam has an S-shaped deformation upon application of a load to said load receiving member, said S-shaped deformation having an inflection point, said beam having a neutral bending fiber; and
wherein said second force transmitting member engages said first force transmitting member approximately in the plane of said neutral bending fiber and at said inflection point.

10. In a scale having load supporting means including a load receiving member for receiving a load to be weighed, and means for supporting said load receiving member:
improved measuring apparatus comprising, in combination,
a cantilever beam having a longitudinal axis, an anchored end, a free end portion, and a bore intersecting said longitudinal axis;
sensing means for sensing strains set up in said cantilever beam; and
means for transmitting force from said load receiving member to said cantilever beam, said force transmitting means comprising a first force transmitting member coupled to said cantilever beam and having a portion aligned with said bore and a second force transmitting member passing with clearance through said bore for transmitting force from said load receiving member to said first force transmitting member; wherein said first force transmitting member is a rigid arm having a first end portion coupled to said free end portion of said cantilever beam and a second portion aligned with said bore; wherein said second force transmitting member is a rod having a first and second conical recess at a first and second end thereof;
further comprising a first cone-shaped peg fixedly connected to said rigid arm for engaging said first conical recess and a second cone-shaped peg connected to said load receiving member for engaging said second conical recess.

* * * * *